United States Patent
Hickey et al.

(10) Patent No.: US 10,840,528 B2
(45) Date of Patent: Nov. 17, 2020

(54) METHOD AND APPARATUS FOR DETECTING DAMAGE IN FUEL CELL STACKS, AND ADJUSTING OPERATIONAL CHARACTERISTICS IN FUEL CELL SYSTEMS

(71) Applicant: CUMMINS ENTERPRISE LLC, Indianapolis, IN (US)

(72) Inventors: Darren Bawden Hickey, Clifton Park, NY (US); Honggang Wang, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 1003 days.

(21) Appl. No.: 15/382,847

(22) Filed: Dec. 19, 2016

(65) Prior Publication Data

US 2018/0175418 A1 Jun. 21, 2018

(51) Int. Cl.

| | |
|---|---|
| *H01M 8/04664* | (2016.01) |
| *H01M 8/04746* | (2016.01) |
| *H01M 8/1246* | (2016.01) |
| *H01M 8/248* | (2016.01) |
| *H01M 8/2432* | (2016.01) |
| *H01M 8/124* | (2016.01) |

(52) U.S. Cl.
CPC ... *H01M 8/04679* (2013.01); *H01M 8/04753* (2013.01); *H01M 8/248* (2013.01); *H01M 8/2432* (2016.02); *H01M 2008/1293* (2013.01)

(58) Field of Classification Search
CPC .......... H01M 8/04679; H01M 8/248; H01M 8/2432; H01M 8/04753; H01M 2008/1293; H01M 8/2475; H01M 8/0494; H01M 8/2425; G01B 21/08; G01B 5/061
See application file for complete search history.

(56) References Cited

U.S. PATENT DOCUMENTS

| | | |
|---|---|---|
| 5,498,487 A | 3/1996 | Ruka et al. |
| 8,002,957 B2 | 8/2011 | Grincourt et al. |
| 8,197,978 B2 | 6/2012 | Ballantine et al. |
| 8,486,576 B2 | 7/2013 | Cheng et al. |
| 8,618,810 B2 | 12/2013 | Suto et al. |
| 8,927,162 B2 | 1/2015 | Akagi et al. |
| 2008/0124590 A1* | 5/2008 | Ballantine ......... H01M 8/04753 429/432 |
| 2014/0354290 A1 | 12/2014 | Fisher et al. |
| 2016/0301094 A1* | 10/2016 | Longman ................ H01M 8/20 |

OTHER PUBLICATIONS

"Integration of Fuel Cells and Electrically Driven Oxygen Separation Systems", IP.Com, https://priorart.ip.com/ IPCOM/000019370, Sep. 12, 2003.

Bram et al., "Deformation Behavior and Leakage Tests of Alternate Sealing Materials for SOFC Stacks", Journal of Power Sources, pp. 111-119, vol. 138, Issues 1-2, Nov. 15, 2004.

Ranaweera et al., "Cell Integrated thin-film Multi-junction Thermocouple Array for in-situ Temperature Monitoring of Solid Oxide Fuel Cells", Sensors, 2015 IEEE, pp. 1-4, Nov. 1-4, 2015.

* cited by examiner

*Primary Examiner* — Muhammad S Siddiquee

(74) *Attorney, Agent, or Firm* — Barnes & Thornburg LLP

(57) ABSTRACT

A method and apparatus for detecting oxidation in at least one planar fuel cell stack that includes a multitude of cells is described. The height of the stack is measured to determine if there has been an increase from a previously-measured height. Such an increase correlates with the oxidation of at least some of the planar cells. In some cases, the fuel flow rate or airflow rate to each fuel cell stack can be adjusted, based in part on the oxidation detection technique. A power delivery system with at least two fuel cell stacks is also described, and it includes a stack height-measurement system, a health monitor for the fuel cell stacks, and a load balancer or airflow regulator.

17 Claims, 4 Drawing Sheets

//  METHOD AND APPARATUS FOR DETECTING DAMAGE IN FUEL CELL STACKS, AND ADJUSTING OPERATIONAL CHARACTERISTICS IN FUEL CELL SYSTEMS

TECHNICAL FIELD

This disclosure relates generally to the field of fuel cells, such as solid oxide fuel cells (SOFCs). In some specific embodiments, the invention relates to methods and devices for detecting oxidation or other deficiencies in fuel cell stacks, as well as methods for compensating for such deficiencies.

BACKGROUND

Fuel cells convert the chemical energy from a fuel into electricity. They function by electrochemically combining the fuel with an oxidant across an ionic conducting layer. Usually, fuel cells require a continuous source of fuel and oxygen (or air), to sustain the chemical reaction. The fuel is most often hydrogen or a hydrogen-containing composition such as methanol, methane, or natural gas. There are many types of fuel cells, but they all include an anode, a cathode, and an electrolyte that allows positively-charged hydrogen ions to move between the two sides of the cell. The anode and cathode contain catalysts that cause the fuel to undergo oxidation reactions that generate positively charged hydrogen ions and electrons. The hydrogen ions are drawn through the electrolyte after the reaction. At the same time, electrons are drawn from the anode to the cathode through an external circuit, producing electricity.

A typical fuel cell operates at a potential of less than about one (1) Volt. To achieve sufficient voltages for power generation applications, a number of individual fuel cells are integrated into a larger component, i.e., a fuel cell stack. To create a fuel stack, an interconnecting member or "interconnect" is used to connect the adjacent fuel cells together in an electrical series, in such a way that the fuel and oxidants of the adjacent cells do not mix together. A fuel cell stack may consist of hundreds of fuel cells. The amount of power produced by a fuel cell depends upon several factors, such as fuel cell type, cell size, the temperature at which it operates, and the pressure of the gases supplied to the cell.

The performance of a fuel cell system depends in large part on the performance and "health" of each individual cell in the stack. If a number of cells begin to degrade for some reason, e.g., warpage, oxidation, or other damaging factors, the overall stack may begin to deteriorate. The key indications of these problems can be loss of stack power, and excessive increases in stack temperature. In some instances, undesirable expansion of the cells in a stack can lead to the cover of the stack popping off the fuel cell structure. High-temperature fuel cells that utilize nickel-based anodes, like some of the SOFCs mentioned above, may be particularly susceptible to individual cell damage, due to excessive oxidation.

The detection of problems with fuel cell stacks at an early stage can be difficult. This is especially the case when individual cells within a stack require inspection. As fuel cell technologists understand, the fuel cell stacks are usually sealed tightly within one or more coverings or casings. (Sealing is especially important in the case of high-temperature fuel cells like the SOFCs). Removing the fuel cell stack from its enclosure(s) can be time-consuming and expensive. Moreover, at least a portion of the fuel cell system may have to be taken off-line during inspection, resulting in loss of power/electricity production.

With these concerns in mind, new processes for identifying defects in fuel cell stacks would be welcome in the art. The processes should be able to detect individual fuel cells that have been damaged or are not working properly, e.g., due to the effects of oxidation. The processes should also avoid or minimize the need for manual inspection of fuel cell stacks. Moreover, it would also be very beneficial if the processes included techniques for monitoring multiple fuel cell stacks for defects or other problems, and then compensating for such problems, e.g., by redirecting power output from an under-performing fuel cell stack to a normally-performing fuel cell stack.

BRIEF DESCRIPTION OF THE INVENTION

One embodiment of the invention is directed to a method for detecting oxidation in at least one planar fuel cell stack that includes a multitude of planar cells. The method comprises the step of measuring the height of the stack to determine if the height has increased from a previously-measured height, wherein an increase in the previously-measured height dimension correlates with the oxidation of at least some of the planar cells.

Another embodiment is a related to a method for detecting oxidation in at least two fuel cell stacks, by measuring the height of each fuel cell stack to determine if the height has increased from a previously-measured height, indicating that oxidation has occurred; and then adjusting a fuel flow rate to each fuel cell stack, so that a fuel cell stack that exhibits oxidation is provided with less fuel; while a fuel cell stack that has not exhibited oxidation will be provided with a greater amount of fuel. In this manner, a total power output from all of the fuel cell stacks remains at a desired level.

A related embodiment also includes measurement of the height of each of at least two fuel cell stacks to determine if oxidation or some other condition exists that would cause one of the fuel cell stacks to operate outside of acceptable temperature parameters. The process further comprises adjusting the airflow being directed to the out-of-specification fuel cell stack, so as to return the temperature of the fuel cell stack to within an acceptable range.

Another embodiment is directed to an apparatus for detecting oxidation in a fuel cell stack, comprising a mechanism, in communication with the fuel cell stack, for measuring fuel cell stack-height, wherein an increase in fuel cell stack-height from a previously-measured height value is an indication of oxidation in the fuel cell stack.

A power delivery system that contains at least two fuel cell stacks represents another embodiment. Each fuel cell stack contains a stack measurement device for measuring an increase in the height of the stack, said increase in height indicating oxidation of cells within the stack that results in an out-of-specification stack that would adversely affect operation of the power delivery system. The power delivery system further comprises:

a) a health monitor to compare the height of each stack and determine if oxidation has occurred in one of the stacks; and b) a load balancer or airflow regulator to control and adjust the fuel flow or airflow, respectively, to each fuel cell stack, so that the operation of the power delivery system can be maintained at an acceptable level by adjusting fuel flow or airflow to compensate for an out-of-specification stack.

DETAILED DESCRIPTION OF THE INVENTION

Figure 1:
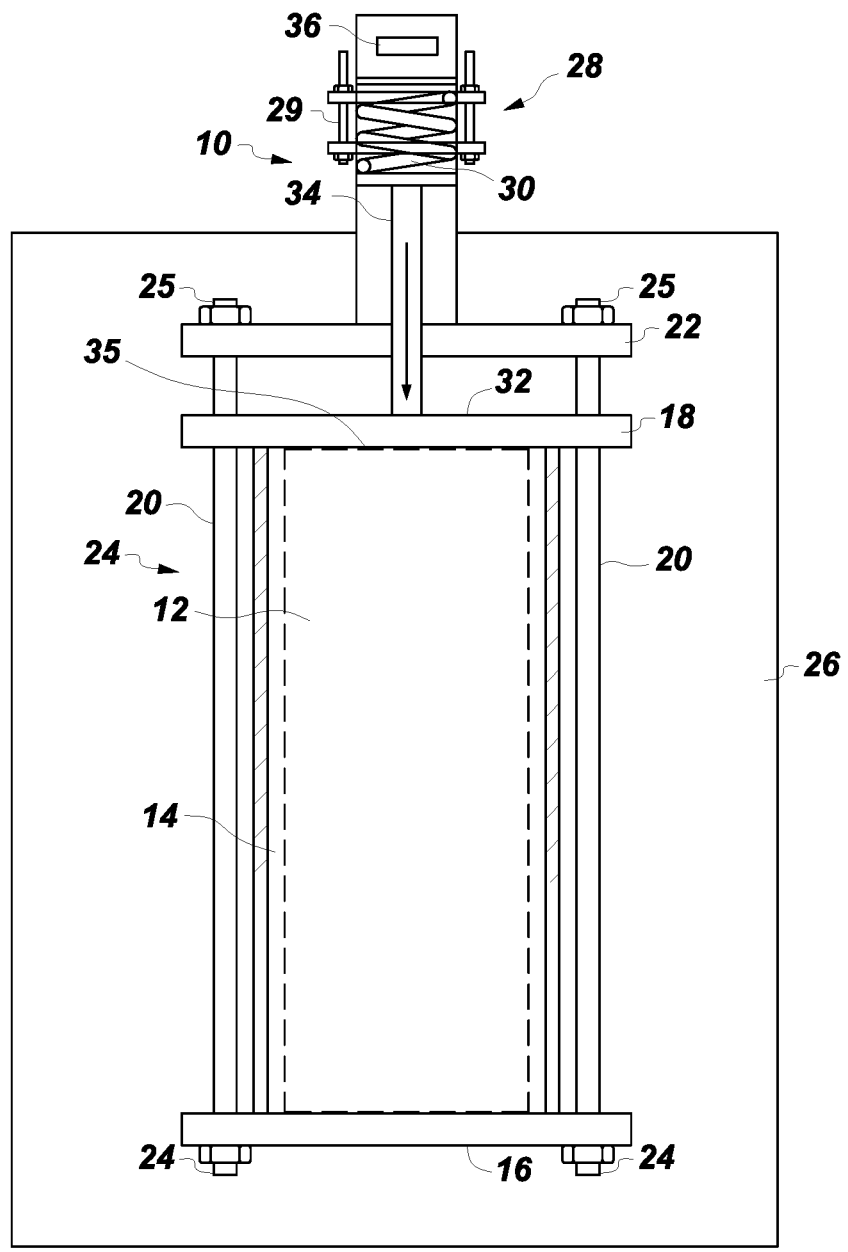
FIG. 1 is a schematic diagram of a portion of a fuel cell stack within an enclosure, and including a stack height-measurement device, according to inventive embodiments.

It should be noted that when introducing elements of various embodiments of the present invention, the articles "a," "an," "the," and "said" are intended to mean that there are one or more of the elements, unless otherwise indicated. Moreover, the term "and/or" includes any and all combinations of one or more of the associated listed items. The terms "comprising," "including," and "having" are intended to be inclusive, and mean that there may be additional elements other than the listed elements. Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value.

As used herein, the term "computer" and related terms, such as a "computing device", are not limited to integrated circuits referred to in the art as a computer, but broadly refers to at least one microcontroller, microcomputer, programmable logic controller (PLC), application specific integrated circuit, and other programmable circuits; and these terms are used interchangeably herein. Moreover, a processor is the logic circuitry that responds to and processes the basic instructions that drive a computer. Typically, a processor is communicatively coupled to a database and other modules of an associated control unit. The processor may include at least one arithmetic logic unit, microprocessor, general purpose controller, or other processor arrays to perform the desired computations.

Various types of fuel calls can be used for embodiments of this invention. Examples include solid oxide fuel cells (SOFCs) and molten carbonate fuel cells (MCFC's). The fuel cell generates direct current (DC) electric power by electrochemically combining a fuel and an oxidant across an ionic conducting layer. The ionic conducting layer, i.e., an electrolyte, is a liquid or solid. In some embodiments, the fuel cell is positioned in electrical series in an assembly of cells, to produce power at useful voltages or currents. While many fuel cells fall within the scope of these inventive embodiments, the disclosure will emphasize details regarding SOFC devices, which are preferred for many end use applications.

In an exemplary embodiment, the fuel cell includes the electrolyte, an anode, and a cathode. The electrochemical reactions that produce DC electricity generally take place at the anode and the cathode, where a catalyst is often employed to accelerate the reactions. The anode and the cathode typically include various channels and porous layers, to increase the surface area for the chemical reactions to occur. The electrolyte carries electrically charged particles from one of the anode and cathode to the other, and is otherwise substantially impermeable to both fuel and oxidant. The anode usually includes an inlet and an outlet to facilitate fuel flow therethrough, and the cathode may contain similar passageways. According to a typical mechanism, the anode discharges a tail gas stream from the anode outlet that includes water, hydrogen, carbon monoxide (CO), carbon dioxide ($CO_2$), and unreacted fuel, if any.

As will be further described below, the fuel cell described herein e.g., the SOFC device, is often a component of a power generation system. The system includes at least one SOFC stack; and multiple stacks are often distributed in two or more modules. A variety of power generation systems having an SOFC stack connected to any type of power block (such as a gas turbine, steam turbine, combustion engine, or additional fuel cell) fall within the scope of this invention.

The fuel cell stacks mentioned above include a multitude of integrated cells (usually planar or substantially planar), in vertical alignment with each other. An interconnect is used to connect the adjacent fuel cells together in electrical series. As is known in the art, each fuel cell may be only a few millimeters thick. Several hundred of them can be connected in series to form the stack.

For embodiments of this invention, the height of the overall stack is a value that is measured and recorded, at least at the time the fuel cell device is ready for operation. The present inventors discovered that an increase in the height of the stack after the device has been in operation is an indication of an abnormal (non-normal) state, usually, but not always, caused by the oxidation of at least some of the planar cells. The symptoms of the abnormal state can include cracking, warpage, or other damage to the cells. (As used herein, "damage" refers more broadly to any condition associated with a fuel cell stack that causes the stack to perform defectively or below a prescribed performance standard; or outside of any specified operational parameter).

Measurement of the height of the stack can be carried out by a number of techniques. FIG. 1 is a perspective view of a fuel cell stack measurement system 10. Details regarding the fuel cell stack itself are not required to understand the present invention. Thus, cell stack 12 is very generally indicated, positioned within measurement system enclosure 14. The stack can rest, directly or indirectly, on a lower support plate 16. An opposite, upper end of the enclosure includes upper plate 18, usually parallel to plate 16, and sometimes referred to as a compression plate. The plates are often aligned and structurally supported by two or more support members 20, which can be metallic tie rods, for example.

A top plate 22, generally parallel to plates 16 and 18, can also be supported by tie rods 20. The assembly 24 of tie rods and plates can be fastened together and made rigid by using bolts 25, although other attachment mechanisms are possible. The assembly is usually enclosed in a chamber 26, sometimes referred to as a "hot box", that is capable of containing any hot fuel cell gasses flowing out of the stack, as well as shielding other components from the outside environment, such as heat exchangers, a steam generator, a fuel desulfurizer and/or one or more reformers.

In some embodiments, a spring mechanism 28 is used to measure changes in the height of stack 12. The spring mechanism can be fastened in place with bolts 29, or by any other suitable fastening means. The spring 30 can be biased against the upper surface 32 of upper plate 18, through top plate 22. A push rod 34, shaft, or other type of connector can be attached below the spring, so as to directly supply the compressive force to the upper plate and the top section 35 of the underlying fuel cell stack. As described in pending U.S. patent application Ser. No. 14/867,409 (K. Brown et al, filed on Sep. 28, 2015), various types of compression mechanisms can be used to maintain a desired pressure on a fuel cell stack. Ser. No. 14/867,409 in its entirety is incorporated herein by reference. The spring mechanism is usually located outside of hot box 26.

In this embodiment, the spring can be tightened to assert a selected amount of downward pressure on plate 18, through the push rod 34, and against lower plate 16. As a non-limiting example, for an SOFC stack containing about 150-200 individual cells, and designed to operate at about 800° C., the spring could be pre-set to about 600-800 kg force, e.g., 700 kg. Any change in the force of the spring correlates to a change in the height of the stack.

The spring mechanism can further include a measurement device for determining the height of the stack, e.g., relative to an initial, or previously-measured height. The spring mechanism can then be used to determine changes in the stack height during operation of the fuel cell device. In one embodiment, the measurement device could be a load cell 36, as shown in simple form, in FIG. 1. Load cells are known in the art and available commercially. Most rely on some form of transducer that can create an electrical signal having a magnitude directly proportional to the force being measured, i.e., the force exerted by spring mechanism 28 on cell stack 12. Examples of available load cells include button cells, strain gauge load cells, and pneumatic load cells. In one embodiment, the load cell is aligned with and attached (directly or indirectly) to spring mechanism 28. In this manner, the load cell is measuring the spring force directly.

In other embodiments, the height of the stack can be measured by a position sensor attached to the stack, and generating a signal representing that height dimension. (The position sensor is not specifically shown in FIG. 1). Various types of position sensors could be used. One example is a linear variable differential transformer (LVDT), used for measuring linear displacement, i.e. the position of an object. The LVDT converts a position or linear displacement from a mechanical reference into a proportional electrical signal. The electrical signal usually includes a phase component, for direction information, and an amplitude component, for distance information. As those skilled in the art understand, LVDT's operate on the principle of a transformer, and usually include a coil assembly and a core. These devices are commercially available, and are described, for example, in U.S. Pat. Nos. 9,395,511; 5,044,186; and 4,149,409, all incorporated herein by reference.

As mentioned above, other types of position sensors can be employed as well. The particular sensor that is selected may or may not rely on the additional use of the spring mechanism described above. The selection will depend in part on the specific sensor design. All of the position sensors that may be used are commercially available. Examples include capacitive displacement sensors, laser rangefinder sensors, and the like.

In a technique that is sometimes preferred for embodiments that involve the use of a spring mechanism and an accompanying load cell, the spring mechanism can be calibrated prior to full operation of the fuel cell. For example, the fuel cell could be run in one or more trials for a given period of time, at selected operating temperatures. The height of the stack and the force on the spring would be monitored during the trial runs. As an illustration, an increase in the force on the spring of about 20 pounds (9 kg) might correlate to a 0.1 inch-deflection (0.25 cm) deflection in the spring. This value would, in turn, correspond to a 0.25 cm-increase in the height of the stack.

Furthermore, the increase in the height of the stack could be calibrated to actual damage to the stack. As mentioned above, the damage can be shown by physical evidence, e.g., observed damage due to oxidation, like the warping of a number of the individual fuel cells. Thus, a system operator would be able to equate the calculated increase in fuel cell stack height with probable damage to the stack, without having to manually inspect the stack.

In another embodiment, the height of the stack can be measured by the use of a bellows structure. As mentioned above, a compression mechanism is sometimes used to maintain a desired pressure on a fuel cell stack. The mechanism can include a casing in the form of the bellows. The casing is capable of containing a pressurized fluid that can exert a selected amount of pressure on an underlying fuel cell stack, as measured, for example, by a pressure gauge. A change in pressure, as shown by the pressure gauge or by the movement of a pressure plate associated with the casing, is an indication that the height of the underlying fuel cell stack has changed. As explained previously, if the stack has increased in height, this may be an indication that cells contained therein have oxidized or otherwise been damaged.

Figure 2:
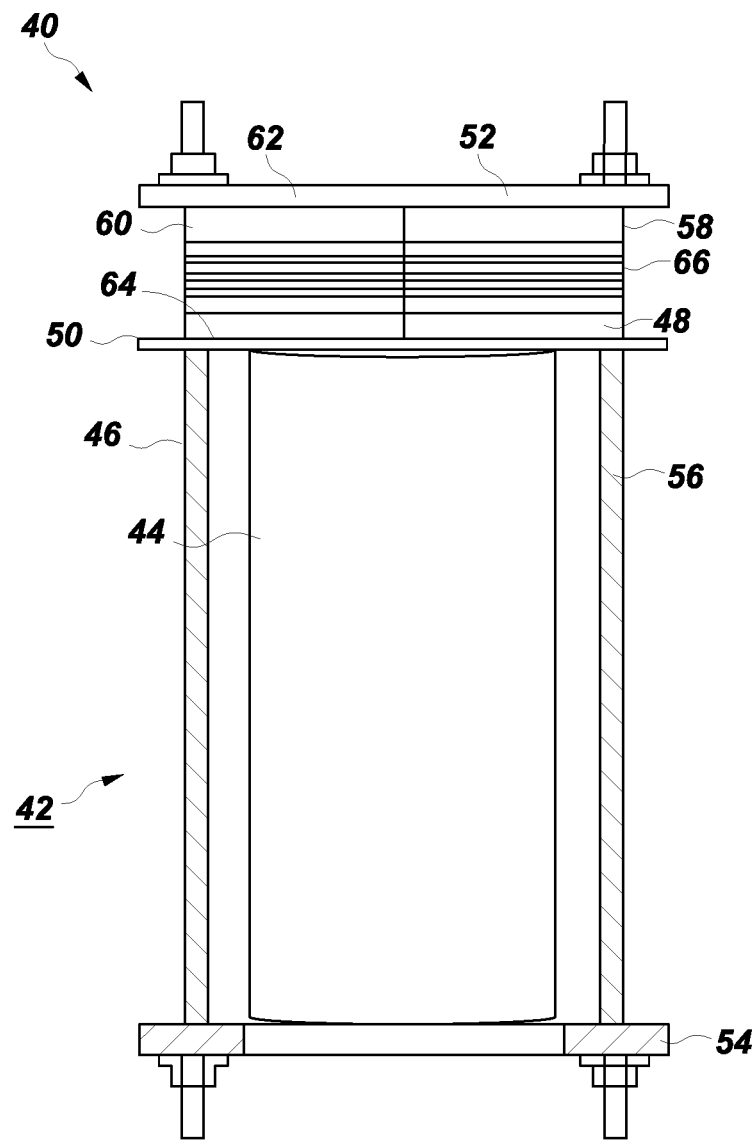
FIG. 2 is a schematic diagram of an exemplary fuel cell stack that includes a stack height-measurement device and a compression mechanism, according to embodiments of this invention.

FIG. 2 depicts this type of embodiment, in which compression mechanism 40 has been adapted to a hot box 42 that contains a fuel cell stack 44. The compression mechanism includes a support frame 46, a pressurized fluid container 48, and a compression plate 50. The support frame includes an upper support plate 52 and a lower support plate 54, along with support members 56. The support members usually extend between and are annularly spaced in relation to upper support plate 52 and lower support plate 54. This design is generally described in the patent application referenced above, Ser. No. 14/867,409 (K. Brown et al). The overall compression mechanism 40 can include a number of variations recited in the Brown et al reference.

With continued reference to FIG. 2, compression plate 50 is movably coupled to support members 56 between upper support plate 52 and lower support plate 54. The pressurized fluid container 48 is situated between the compression plate and the upper support plate. The fuel cell stack 44 is disposed between lower support plate 54 and compression plate 50. In this manner, the compression plate directly contacts the pressurized fluid container 48 and the fuel cell stack 44 during operation of the fuel cell compression mechanism. (The source of compression is usually a pressurized fluid line, not depicted herein, but discussed in the Brown et al patent application).

As also noted in the exemplary embodiment of FIG. 2, the pressurized fluid container 48 includes a casing 58 that defines an interior space 60, configured to contain the pressurized fluid. The casing includes a top wall 62, a bottom wall 64, and a sidewall 66, extending between the top wall and the bottom wall. Upper support plate 52 and compression plate 50 are coupled to sidewall 66, such that the upper support plate 52 at least partially forms top wall 62; and compression plate 50 at least partially forms bottom wall 64.

Sidewall 66 in FIG. 2 is at least partially flexible, such that the sidewall can extend or collapse as interior space 60 changes in volume. To facilitate flexible positioning, the sidewall is relatively thin, and can be corrugated throughout a substantial amount of its area. As the sidewall extends or collapses, at least one of the top wall 62 and the bottom wall 64 moves in relation to the other. As one example alluded to previously, the casing 58 can be in the form of a bellows structure, which can easily be incorporated into this relative movement-design between the top wall and the bottom wall. Alternatively, other structures could be incorporated into the casing, e.g., a pillow-shaped casing, as mentioned in the Brown et al patent Application.

With continued reference to FIG. 2, it can be seen that the compression mechanism 40 allows a selected amount of force to be maintained on the fuel cell stack, during operation of the fuel cell. Compression plate 50 is moved in relation to support plate 54, such that the compressive forces on the fuel cell stack 44 are maintained at a desired pressure. Since the pressure level can be monitored closely, any change in the pressure can register as a change in the height of fuel stack 44. This change, in turn, can then be equated to a possible, adverse change in the condition of any cells in the stack, as described previously. Moreover, the compression mechanism in this embodiment can also include a position sensor as described previously (e.g., the LVDT), measuring changes in the dimension (distance) between plate 50 and support plate 52, which can be used to calculate the stack height.

In general, it should also be noted that multiple fuel cell stacks may be contained in a single enclosure or hot box. In that instance, the height of each stack can be measured by one of the techniques described above, to determine if an individual stack has been adversely affected by oxidation. Moreover, as further described below, an overall fuel cell-containing power system can include multiple enclosures or modules, each containing at least two fuel cell stacks.

Another embodiment of the invention is directed to a method and system for controlling the operation of at least two fuel cell stacks when oxidation has been detected in one of the stacks according to the process described previously. The features of this method can first be described briefly: Data regarding the relative height of each fuel cell stack, obtained initially and at intervals during a trial-fuel cell operation, can be stored in a data collector, e.g., a computer processor-based device. A fuel cell stack monitoring module, also computer-based in a typical design, processes the data from the data collector, comparing the changes in each cell stack height value. A load cell or other type of position sensor on a given fuel cell stack provides an indication if the stack has increased in height and undergone oxidation, or has been damaged in some other way. A connected compensation unit re-balances the operation of each fuel cell stack, so as to compensate for the damaged stack, according to the requirements for the overall power-delivery system.

Figure 3:
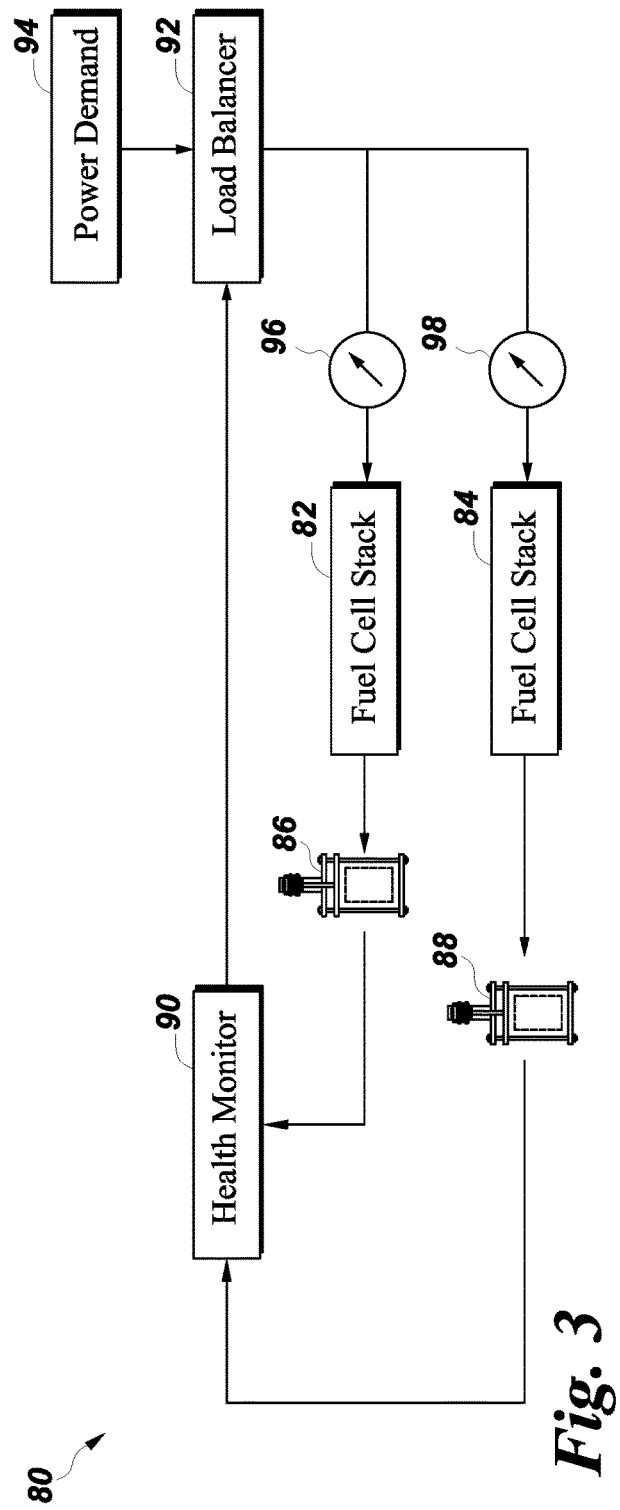
FIG. 3 is a simplified diagram of a power delivery system that includes both a fuel cell stack height-measurement system for multiple fuel cell stacks, along with a fuel flow-balancing system.

One specific embodiment is illustrated in FIG. 3, which is a diagram of a simplified power delivery system 80, that includes a first fuel cell stack 82 and a second fuel cell stack 84. Each fuel cell stack includes a stack measurement device for measuring changes in the height of the stack. While load cells are exemplified in this figure, the measurement device can be any of the devices or systems mentioned above, e.g., an electronic position sensor like an LVDT, or a bellows structure. Stack measurement device 86 is connected to fuel cell stack 82, while stack measurement device 88 is connected to fuel cell stack 84.

Both stack measurement devices are connected to system health monitor 90. The health monitor is typically a computer-based system that can receive and process stack-height data. The data can include changes in stack height for each cell, over any selected length of time. The data can also include a comparison of stack 82 with stack 84, in terms of height. As described previously, an increase in stack height provides an indication that the cells in the stack may be degrading in some way, e.g., due to the effects of oxidation.

Moreover, in line with the calibration technique described previously, the health monitor can, in some embodiments, include one or more processors that correlate stack height changes and stack damage to a loss of power in the stack. The correlation can be based on a series of trial evaluations. The trial data can be incorporated into the processor(s), using known correlation techniques, e.g., a look-up table based on transfer functions relative to the data.

Data from health monitor 90, regarding the relative heights of the two stacks (and in some cases, a power loss in a stack), can then be transmitted to load balancer 92. The load balancer can take the form of any type of operational regulator for the fuel cell, and it is sometimes referred to as a "compensation unit". The load balancer also communicates with power demand module 94, which can take a number of forms.

In general, power demand module 94 can be any device that measures and indicates the total power demand on the fuel cell system, based on the power requirements for an external source, e.g., an external power grid or other entity or power customer. As an example, the total power demand may be 1.0 megawatts (MW). With reference to FIG. 3, the total power demand will typically be distributed equally between fuel cell 82 and fuel cell 84, i.e., 0.5 MW each. In other words, an appropriate portion of a hydrogen-based fuel (as described above) will be metered through fuel valves 96 and 98. When combined with a conventional oxygen source according to fuel cell reaction principles, each fuel cell stack 82 and 84, receiving equal amounts of fuel, should produce equal amounts of electricity.

If health monitor 90 indicates that one of the fuel cell stacks 82 or 84 is damaged or otherwise operating below expectation, a signal is transmitted to load balancer 92. In this embodiment, the load balancer will effectively re-balance the fuel flow, so that a greater amount of fuel is directed to the fuel cell that is performing up to specification (i.e., "in-specification"), while a lower amount of fuel is directed to the fuel cell that is out-of-specification, i.e., performing outside of one or more acceptable parameters, such as a specified temperature or temperature range.

Thus, as a simple, non-limiting illustration, if fuel stack 82 appears to be operating at 10% below specification, based on stack height measurements, then 10%-less fuel will be directed through fuel valve 96 to power that cell, based on control from load balancer 92. Cell stack 82 might therefore produce 0.4 MW of power. Consequently, 10%-more fuel will be directed through fuel valve 98—also controlled by the load balancer—so as to produce approximately 10% more electricity (power) from fuel cell stack 84, e.g., 0.6 MW of power. In this manner, the total power output for the fuel cell system will remain at 1.0 MW, satisfying the specified demand from the outside customer. (Those skilled in the art understand that the power output for a fuel cell system is related in part to the "fuel utilization rate", i.e., the amount of fuel consumed per amount of fuel supplied. This in turn is a function of the supply fuel feed rate and the load applied to the fuel cell stack(s)).

In some instances, a fuel cell stack may be operating below specification because it is not receiving enough fuel. In this instance, the health monitor, recognizing the particular type of defective condition, would transmit an appropriate signal to the load balancer, as mentioned previously. However, in this situation, the signal would result in a greater amount of fuel being directed to the under-performing fuel cell stack, in order to bring the stack back into specification.

It should also be noted that the load balancer can be effected manually, e.g., by observation and control at the hands of one or more operators. Alternatively, the load balancer can perform its function automatically. For example, one or more associated computer controls/processors can coordinate the action of the load balancer with incoming data from the health monitor, along with the overall power demand.

In many embodiments, multiple fuel cell stacks will be contained within at least two modules. Each stack may contain several hundred individual cells, as noted previously. Moreover, the design and components of each module are generally known in the art. (See, for example, National Energy Technology Laboratory publications, "Cell, Stack & Module/SOFC Power Systems", December 2016, U.S. Department of Energy website, incorporated herein by reference). Related components and features include inlet/outlet air manifolds, inlet/outlet fuel manifolds, electrical power take-offs, stack mechanical loading devices, and insulation systems. In this manner, the desired power rating for an entire fuel cell system can be configured by attaching as many modules as is necessary in the system, e.g., from 50 kW up to about several million MW.

Figure 4:
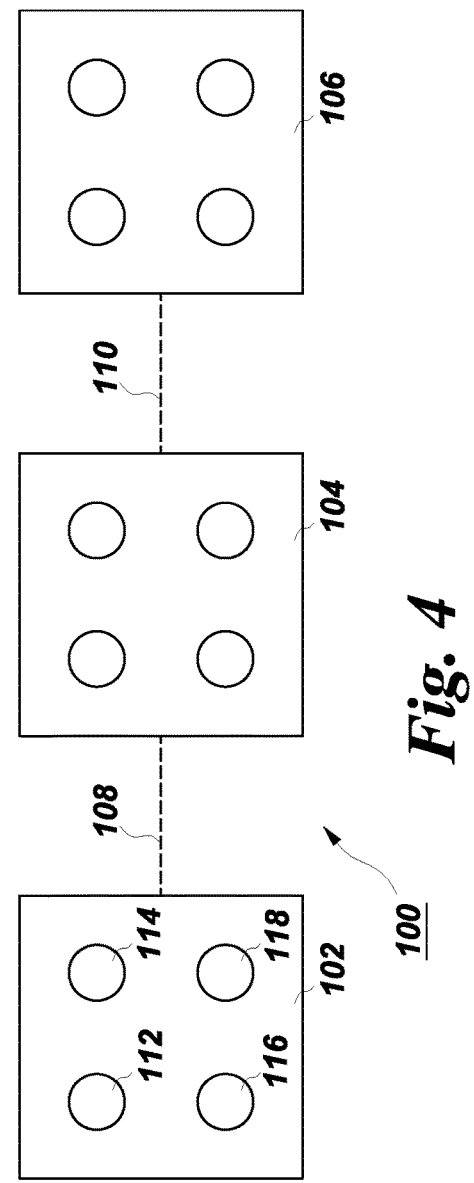
FIG. 4 is a simplified depiction of a multi-module fuel cell system, containing a number of fuel cell stacks in each module.

Thus, in another exemplary embodiment, the operation of at least two fuel cell modules can be controlled, based on a defective or under-performing fuel cell stack in any of the individual modules. FIG. 4 is a non-limiting, simplified depiction of a multi-module fuel cell system 100. The overall system includes three modules, 102, 104, and 106, interconnected to each other by standard electrical/mechanical connections 108, 110, according to general connection technology known in the art. (See, for example, the website http://www.fuelcellenergy.com/why-fuelcell-energy/how-do-fuel-cells-work/, December 2016, incorporated herein by reference, depicting an exemplary mechanical balance of plant, and an electrical balance of plant). Each module is illustrated simplistically with four fuel cell stacks, e.g., stacks 112, 114, 116, and 118 in module 102. The electrical/mechanical connections between each stack in a module are omitted for simplicity.

According to the general process described previously, each of the individual fuel cell stacks in each module can be monitored for any increase in a pre-determined height for the stack, using one or more system health monitors as described previously (and not shown in FIG. 4). The increase in height is an indication of undesirable oxidation or other damage to one or more of the cells in that stack. If the estimated damage to the stack (or to multiple stacks in a single module) is above an acceptable limit, an associated load balancer (not shown) will compensate by reducing the power requirement for the particular module.

The adjustment initiated by the load balancer can be carried out by changing the fuel flow rate to the particular module (e.g., using one or more fuel valves). Alternatively, the adjustment can be carried out by changing the airflow rate to increase cooling, as further described below. In the case of a fuel flow rate adjustment, less power will be extracted from the module containing the damaged fuel cell stack, and greater power will be extracted from one of the other modules, or from multiple modules that contain properly-functioning fuel cell stacks. In this manner, the total, required power output from the multi-module fuel cell system can be maintained. (In a manner similar to other embodiments, there may also be situations in which the fuel flow rate to a particular module may be increased, if it is determined that the deficiency in a fuel cell stack is related to insufficient fuel flow, rather than an oxidation problem, for example).

Figure 5:
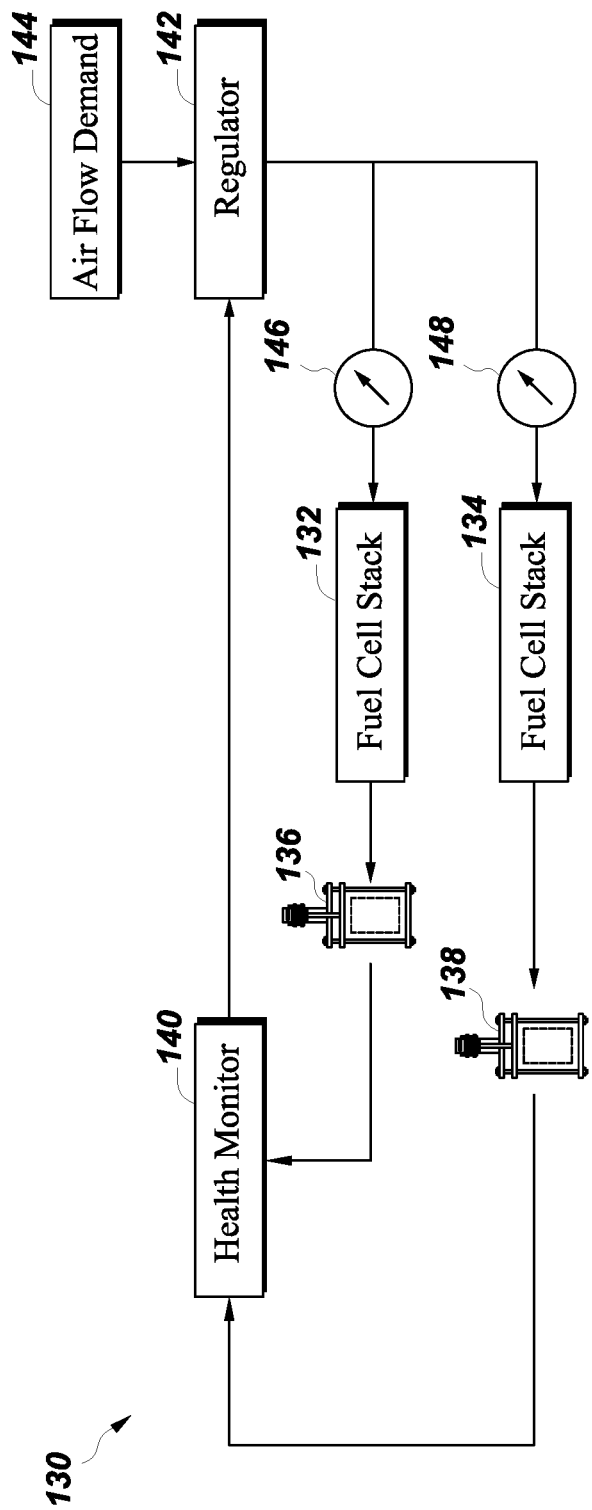
FIG. 5 is a simplified diagram of another power delivery system according to inventive embodiments, including a fuel cell stack height-measurement system for multiple fuel cell stacks, along with an airflow regulation system to control the temperature of each fuel cell stack.

Another alternative to the fuel rate-based embodiment of FIG. 3 is illustrated in FIG. 5. Power delivery system 130 includes a first fuel cell stack 132 and a second fuel cell stack 134. As in FIG. 3, each fuel cell stack includes a stack measurement device, e.g., a load cell. The stack measurement device 136 is connected to fuel cell stack 132; while stack measurement device 138 is connected to fuel cell stack 134. As in the previous embodiment, both stack measurement devices are connected to system health monitor 140, which can receive and process stack-height data, and is usually computer-based. The data can compare stack 132 with stack 134, in terms of height, with any increase in height indicating a possible problem with one or more cells in the stack, as described previously. Additional systems to calibrate increased stack height with loss of power to the stack may be incorporated into this system, as also discussed previously.

(Moreover, in some instances, it may be useful to use the processes described herein to determine if a fuel cell stack has decreased in height—rather than increased—relative to a previously-measured dimension. The decrease in height may also be indicative of an operational phenomenon that can be addressed by the fuel delivery or air delivery balancing techniques described herein).

In a manner analogous to the embodiment of FIG. 3, data from health monitor 140 in FIG. 5, regarding the relative heights of the two stacks (and in some cases, a power loss in a stack), can then be transmitted to airflow regulator 142. The regulator also communicates with airflow command module 144, which can take a number of forms. The process air that can be routed through airflow valves 146 and 148 can be used to adjust the temperature of a fuel cell stack that is operating outside an acceptable temperature value or temperature range. For example, the process airflow can be increased to function as a coolant, bringing down the temperature of a fuel cell stack that might be overheating. In other instances, the flow of process air can be decreased, thereby raising the temperature of a fuel cell stack that might be too cold.

Thus, as a simple illustration, fuel stack 132 may be operating outside of specification, based on stack height measurements, or based on another characteristic that can be monitored by health monitor 140. If the performance problem with the fuel cell stack causes an undesirable increase in stack temperature, then a greater amount of airflow (based on control from regulator 142) will be directed through valve 146, to cool down the fuel cell stack 132 to an acceptable temperature. In some embodiments, the airflow through valve 148 to fuel cell stack 134, which is behaving normally, can, at the same time, be decreased in an amount proportionate to the increase in airflow to stack 132. The decrease in airflow will allow stack 134 to operate at a higher temperature. (However, it is not always necessary that the airflow to stack 134 be counter-balanced with the airflow to stack 132). Furthermore, as described for the embodiment of FIG. 3, this system can operate either manually or automatically, e.g., with computer-based coordination between health monitor 140, regulator 142, and airflow command module 144.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method for detecting oxidation in at least one planar fuel cell stack that includes a multitude of fuel cells, the method comprising
    measuring the height of the fuel cell stack with a measuring mechanism to determine if the height has increased from a previously-measured height, wherein an increase in height of the fuel cell stack over the previously-measured height correlates with oxidation of at least one of the multitude of fuel cells.

2. The method of claim 1, wherein the multitude of fuel cells within the fuel cell stack are in vertical alignment with each other, and at least one plate is disposed over a top section of the fuel cell stack.

3. The method of claim 2, wherein the measuring mechanism is a spring mechanism comprising a spring,
    wherein the spring is biased against the plate so that a measurable force is applied to the fuel cell stack in a vertical direction, and a change in the measurable force of the spring correlates to a change in the height of the fuel cell stack.

4. The method of claim 3, wherein the fuel cell stack is contained within a hot box, and the spring is positioned outside of the hot box.

5. The method of claim 4, wherein the spring is attached to the plate disposed over the top section of the fuel cell stack by a connector and through an opening in the hot box.

6. The method of claim 1, wherein the measuring mechanism to measure the height of the fuel cell stack further comprises a load cell attached to the fuel cell stack.

7. The method of claim 1, wherein the measuring mechanism to measure the height of the fuel cell stack further comprises a position sensor attached to the fuel cell stack.

8. The method of claim 7, further comprising the position sensor generating a signal corresponding to the height of the fuel cell stack.

9. The method of claim 7, wherein the position sensor is a linear variable differential transformer (LVDT).

10. The method of claim 2, wherein the measuring mechanism to measure the height of the stack is a compression mechanism, wherein the compression mechanism is disposed over the top section of the fuel cell stack, and configured to maintain a specific pressure directly on the fuel cell stack.

11. The method of claim 10, wherein the compression mechanism comprises a casing that can be pressurized externally, wherein the casing comprises a bellows structure.

12. The method of claim 1, wherein the multitude of fuel cells are solid oxide fuel cells (SOFCs).

13. The method of claim 1, wherein multiple fuel cell stacks are contained within a hot box, and the measuring of the height of each fuel cell stack with a measuring mechanism is to determine if the height of the respective fuel cell stack has increased from a previously-measured height.

14. The method of claim 1, wherein multiple fuel cell stacks are contained in at least two modules; and the measuring of the height of each fuel cell stack in each module with a measuring mechanism can determine if its height has increased from a previously-measured height.

15. The method of claim 1 for detecting oxidation in at least two fuel cell stacks, further comprising adjusting the fuel flow rate to each fuel cell stack, further comprising adjusting the fuel flow rate to each fuel cell stack, so that a fuel cell stack that exhibits oxidation is provided with less fuel, while a fuel cell stack that does not exhibit oxidation is provided with a greater amount of fuel, so that a total power output from all of the fuel cell stacks remains at a constant level.

16. The method of claim 15, wherein the at least two fuel cell stacks are contained in at least two fuel cell stacks are contained in at least two modules, and the fuel flow rate to each module is adjusted if one of the modules contains a fuel cell stack that exhibits oxidation, such that the module containing the fuel cell stack exhibiting oxidation is provided with less fuel, while a module that does not contain a fuel cell stack exhibiting oxidation is provided with a greater amount of fuel, so that a total power output from all of the modules remains at a constant level.

17. The method of claim 1, further comprising measuring the temperature of the fuel cell stacks where oxidation has occurred, and adjusting the airflow rate to the fuel cell stacks where oxidation has occurred if one of the fuel cell stacks exhibits a temperature that is outside an acceptable limit, so as to return the temperature of the fuel cell stacks to a temperature within the acceptable limit.

* * * * *